United States Patent [19]
Sapienza

[11] Patent Number: 5,876,621
[45] Date of Patent: Mar. 2, 1999

[54] ENVIRONMENTALLY BENIGN ANTI-ICING OR DEICING FLUIDS

[76] Inventor: Richard Sapienza, 1 Miller Ave., Shoreham, N.Y. 11786

[21] Appl. No.: 940,936

[22] Filed: Sep. 30, 1997

[51] Int. Cl.$^6$ ..................................................... C09K 3/18
[52] U.S. Cl. .............................................. 252/70; 106/13
[58] Field of Search .................................. 106/13; 252/70

[56] References Cited

U.S. PATENT DOCUMENTS

| | | | |
|---|---|---|---|
| 4,223,129 | 9/1980 | Roth et al. .................................. | 536/4 |
| 4,329,449 | 5/1982 | Roth et al. .............................. | 536/18.6 |
| 4,448,702 | 5/1984 | Kaes ......................................... | 252/70 |
| 4,647,392 | 3/1987 | Darden et al. ............................ | 252/75 |
| 4,664,832 | 5/1987 | Sandvig et al. .......................... | 252/70 |
| 4,746,449 | 5/1988 | Peel .......................................... | 252/70 |
| 4,960,531 | 10/1990 | Connor et al. ........................... | 252/70 |
| 5,324,442 | 6/1994 | Mathews .................................. | 252/70 |
| 5,350,533 | 9/1994 | Hubred et al. ........................... | 252/70 |
| 5,376,293 | 12/1994 | Johnston ................................... | 252/70 |
| 5,387,358 | 2/1995 | Himmrich et al. ....................... | 252/70 |
| 5,387,359 | 2/1995 | Himmrich et al. ....................... | 252/70 |
| 5,435,930 | 7/1995 | Chan et al. ............................... | 252/70 |
| 5,484,547 | 1/1996 | Mendoza .................................. | 252/73 |
| 5,635,101 | 6/1997 | Janke et al. .............................. | 106/13 |
| 5,709,812 | 1/1998 | Janke et al. .............................. | 106/13 |
| 5,709,813 | 1/1998 | Janke et al. .............................. | 106/13 |
| 5,718,834 | 2/1998 | Pollmann et al. ........................ | 106/13 |

OTHER PUBLICATIONS hhtp://www.vigoro.on.ca/ice/ingred.html "Common Ice Melter Ingredients" Aug. 30, 1998.

*Primary Examiner*—Anthony Green
*Attorney, Agent, or Firm*—Hedman, Gibson & Costigan, P.C.

[57] ABSTRACT

The present invention provides a deicing composition which is environmentally benign and a process for producing the composition from certain waste process streams.

17 Claims, No Drawings

ENVIRONMENTALLY BENIGN ANTI-ICING OR DEICING FLUIDS

The present invention relates to a deicing fluid composition. More particularly the present invention relates to a deicing fluid composition which is environmentally benign. Most particularly the present invention relates to an environmentally benign deicing fluid composition which is obtained from various industrial waste streams.

BACKGROUND OF THE INVENTION

Freezing point lowering compositions are in widespread use for a variety of purposes, especially to reduce the freezing point of an aqueous system so that ice cannot be formed or to melt formed ice. Generally, freezing point lowering compositions depend for their effectiveness upon the molar freezing point lowering effect, the number of ionic species which are made available and the degree to which the composition can be dispersed in the liquid phase in which the formation of ice is to be precluded and/or ice is to be melted.

The most pervasive of the commonly used products for deicing are common salt, calcium chloride and urea, with common salt (sodium chloride) being the least expensive and most commonly used. Common salt is widely used to melt ice on road surfaces and the like. In this manner the salt forms a solution with the available liquid in contact with the ice and thereby forms a solution with a lower freezing point than the ice itself so that the ice is melted. Chloride salts however suffer from relatively severe drawbacks, such as the harmful affects on surrounding vegetation by preventing water absorption in the root systems, and its corrosive effects on animal skin such as the feet of animals, clothing and roadways and motor vehicles.

Other inorganic salts are also known such as magnesium chloride, potassium phosphates, sodium phosphates, ammonium phosphates, ammonium nitrates, alkaline earth nitrates, magnesium nitrate, ammonium sulfate, alkali sulfates.

Typical solutions of low freezing points include brines, ethylene glycol and propylene glycol solutions. Brines are used to transfer heat at temperatures below the normal freezing point of water, and the ethylene glycol solutions are well known for use as coolants for automobiles and the like in regions in which the temperature may fall below the normal freezing point of water. Ethylene and propylene glycols are used in relatively large quantities at major airports in northern climates in order to keep air traffic flowing during inclement weather. The fluids are generally applied to the wings, fuselage and tail of aircraft as well as the runways to remove ice. However, these glycol compounds likewise have environmental drawbacks and can be detrimental to sewage treatment processes.

Other prior art deicing fluids such as alcohols have toxic effects and high volatility particularly in the low molecular weight range and may be the cause of offensive smell and fire danger. Furthermore, mono- and polyhydric alcohols oxidize in the presence of atmospheric oxygen to form acids, which can increase corrosion of materials.

Due to the problems associated with deicing agents as described above there have been attempts to prepare even more deicing agents. For, example, Kaes, U.S. Pat. No. 4,448,702 discloses the use of a freezing-point lowering composition and method which calls for the addition of a water soluble salt of at least one dicarboxylic acid having at least three carbon atoms, such as a sodium, potassium, ammonium or organoamine salt of adipic, glutaric, succinic or malonic acid.

Peel, U.S. Pat. No. 4,746,449 teaches the preparation of a deicing agent comprising 12–75% acetate salts, trace-36% carbonate salts, 1–24% formate salts and 1–32% pseudolactate salts which is prepared from a pulp mill black liquor by fractionating the black liquor into a molecular weight fraction and concentrating the collected low molecular weight fraction to produce the deicing agent.

However, both of these disclosures still require the presence of salts. Accordingly there still exists in the art a need for an environmentally benign deicing agent which is relatively inexpensive to obtain.

SUMMARY OF THE INVENTION

Accordingly the present invention comprises a deicing agent which is environmentally benign and can be produced from relatively inexpensive feedstocks. The deicing agent comprises a water soluble solution of hydroxycarboxylic acid based esters. The compositions of the present invention can be applied to a wide variety of surfaces, particularly metallic and non-metallic surfaces of aircraft, which prevents icing, removes frozen water from the surface and prevents its reformation. The invention provides for a deicing composition which can be used on airplanes, runways, streets and the like. Further, the compositions can be used in heat transfer applications and to applications in which it is vital to maintain a liquid in the unfrozen state, e.g., as in a fire extinguisher.

The deicing agents can be prepared from pure components, or more preferably are prepared from waste process streams such as from the admixture of components of a pulp mill black liquor with distiller grain solubles and/or whey; the acid treatment of pre-distilled wood, agricultural and/or milk fermentation; the alcoholysis of distiller grain solubles or any combination thereof.

DETAILED DESCRIPTION OF THE PRESENT INVENTION

The present invention provides a novel composition useful as a deicing agent and a novel method of preparing the deicing agents.

The deicing agents of the present invention comprise a hydroxycarboxylic acid ester. Hydroxycarboxylic acid esters are well known to those of ordinary skill in the art and typically comprise hydroxyformate, hydroxyacetate, hydroxypropionate, hydroxybutyrate, hydroxylaurate, hydroxypalmitate, hydroxyoleate, hydroxybenzoate as well as others. Preferred for use in the practice of the present invention are deicing agents comprising α-hydroxypropionate type esters such as alkyl lactates.

In addition to the hydroxycarboxylic acid esters, a wide variety of other components may be included in the deicing compositions of the present invention. Along with the free hydroxycarboxylic acid, preferably these include low molecular weight glycosides and water soluble anionic hydroxycarboxylic acid salts. Generally these components are present in or are derived from the process waste streams from which the compositions of the present invention may be obtained.

Also, it is contemplated herein that anionic hydroxycarboxylic acid salts alone or with amino acids and/or water soluble salts of dicarboxylic acids having at least three carbon atoms, preferably selected from adipic, succinic, glutaric and malonic acids may also be included, but are not necessary to the practice of the present invention. These can be added separately such as through the addition of pulp mill black liquors or via alkali additions to hydroxycarboxylic acid containing compositions.

The deicing agents may be prepared from the pure chemical ingredients. For instance, a solution of 25% $H_2O$/10% sodium lactate/65% ethyl lactate was found to have no crystal formation at a temperature of $-50°$ C.

However, it is especially preferred to obtain the deicing agents of the present invention from any of a number of industrial waste streams which comprise a water soluble solution of hydroxycarboxylic acid, since lactic acid as it occurs in dilute fermentation liquors is inexpensive. The purification of this material is difficult due to its similarity in solubility characteristics to water as the presence of impurities such as dextrins, proteins and unfermented sugars. For instance, the present invention contemplates the use of waste stream selected from the group consisting of a grain stillage, a wood stillage, agricultural or milk fermentation and mixtures of any of the foregoing. Generally, the components of the present invention are present in or are derived by alcoholysis of the process waste streams. Typically these waste streams include components such as lactic acid fractions and low molecular weight sugars such as sorbitols, maltoses and glucoses.

By subjecting the waste streams to alcoholysis (with an alkyl alcohol) under conditions such as reacting with an alkyl alcohol in the presence of a cation exchange material or other acid, or the addition of an alkyl alcohol to a heated fermentation liquor as taught in Ind. Eng. Chem., 38, pg. 228, 1946 by E. M. Filachione and C. H. Fisher, at least some of the hydroxycarboxylic acids present are converted to the hydroxycarboxylic acid based esters and at least some of the sugars are converted to glucosides, thereby improving the overall acidity of the material. For instance, ethanol treatment of a typical agricultural fermentation waste stream comprising lactic acid and glucose would be partially converted to ethyl lactate and ethyl glucoside. The use of the alcoholysis process aids in increasing the concentration of the glycosides and hydroxycarboxylates, thereby providing an improved product.

For example, components of the present invention can include, but are not limited to: ethyl lactate, glycerol, glycol lactate, ethyl glycinate, ethyl levulinate, ethylenecarbonate, glycerin carbonate, pipecolic acid, tetrahydrofurfuryl acetate, tetrahydrofurfuryl tetrahydrofuroate, sorbitol, glucose glutamate, methyl glucosides, acetals and ketals of glycerol such as 2,2-dimethyl-1,3-dioxolane-4-methanol, and the like.

As discussed above, although not critical for the present invention, the compositions of the present invention may further comprise high solubility salts in combination with the hydroxycarboxylates and glucosides. For example, useful salts could include, but are not limited to: sodium lactate, cesium acetate, sodium acetate, potassium acetate, sodium formate, sodium citrate, lysine glutamate, sodium glucoheptonate, sodium and potassium salts of adipic, glutaric, succinic and malonic acids, lignin sulfonate, and the like.

The amount of the acid components, i.e. the hydroxycarboxylic acid esters, hydroxycarboxylic acid salts, lignins and glucosides, which are present in the compositions of the present invention may vary widely and still provide the improved freezing point lowering effect. Preferably, however, the compositions of the present invention comprise a total weight of acid components ranging from about 10 to about 75 weight percent, more preferably from about 20 to about 75 weight percent and most preferably from about 30 to about 75 weight percent.

The compositions of the present invention are considered non-toxic and readily breakdown, even at low temperatures, in the natural environment without any significant adverse effects. Moreover, the composition is considered to have lower Biological Oxygen Demand (BOD) requirements than comparable de-icers, and a lesser amount of the composition of the present invention (higher water concentration) is required to prevent ice formation at a particular ambient air temperature or quantity of ice. Since the concentration of an anti-icer that is applied should be sufficient to prevent significant ice formation under reasonable conditions much smaller material usage for the composition of the present invention at particular outside air temperatures and precipitate rates results.

DESCRIPTION OF THE PREFERRED EMBODIMENTS

The following examples are provided for illustrative purposes and are not to be construed to limit the scope of the claims in any manner whatsoever. Melting points were determined using a Differential Scanning Calorimeter (DSC). Scans were conducted from $-160°$ C. up to $30°$ C. at $10°$ C. per minute on a 1 mg sample taken from a 20 g mixture. The complete melt point was utilized.

EXAMPLE 1

A mixture of 25% by weight water, 65% by weight ethyl lactate and 10% by weight sodium lactate was prepared. No crystal formation was observed at a temperature of $-50°$ C.

EXAMPLE 2

A mixture of 50% by weight water and 50% by weight ethyl lactate was prepared. The mixture had a melting point of $-18°$ C.

EXAMPLE 3

A mixture of 70% by weight water, 24% by weight ethyl lactate and 6% by weight sodium lactate was prepared. The mixture had a melting point of $-25°$ C. as determined by DSC and a pH of 6.0. For comparison, a 70% by weight water/30% by weight ethylene glycol solution has a melting point of $-18°$ C.

EXAMPLE 4

The addition of 50% by weight of a 50% mixture of ethyl lactate in water to a concentrated, filtered corn steep liquor (containing 50% water and 50% solids comprising mostly lactic acid and sugars) caused a reduction in freezing point from $-11°$ C. to $-16°$ C. The addition of 2% by weight sodium lactate further reduced the freezing point to $-20°$ C.

EXAMPLE 5

A mixture of 60% by weight water, 20% by weight sodium lactate, 2% by weight proline (an amino acid), 8% by weight sorbitol and 10% by weight sodium pyrrolidone carboxylate (sodium PCA) was prepared. No crystal formation at $-35°$ C. was observed. The pH was 6.57. For comparison a 50% by weight solution propylene glycol has a freezing point of $-36°$ C.

EXAMPLE 6

A mixture of 12% by weight methyl lactate, 44% by weight methyl glucoside and 44% by weight water was prepared. A melting point of −18° C. was observed. The mixture had a pH of 5.

EXAMPLE 7

A mixture containing 35% by weight methyl lactate, 35% by weight methyl glucoside and 30% by weight water has a melting point of −21° C. as determined by DSC.

EXAMPLE 8

A filtered concentrated liquid residue of a 50% mixture of corn stillage and steepwater containing 50% by weight water with a freezing point of −12° C. is heated to 90° C. and treated with 5% ethanol for 8 hours. The resulting mixture has a freezing point of −17° C. The addition of 2% sodium lactate further reduces the freezing point to −21° C.

The above-referenced patents and publications are hereby incorporated by reference.

Many variations of the present invention will suggest themselves to those skilled in the art in light of the above-detailed description. For example, any process stream which contains components from which hydroxycarboxylates can be prepared may be used to prepare the compositions of the present invention. Additionally, a wide variety of lignins, sugars and glucosides may be present in the compositions of the present invention. All such obvious modifications are within the full intended scope of the appended claims.

I claim:

1. A method of preparing a substantially environmentally benign deicing composition, said method comprising:
   (a) recovering an industrial waste stream comprising hydroxycarboxylic acids; and
   (b) alcoholizing at least a portion of hydroxycarboxylic acids in said recovered waste stream with an alkyl alcohol to convert said portion of hydroxycarboxylic acids to water soluble hydroxycarboxylic acid esters.

2. A method as defined in claim 1 wherein said waste stream further comprises sugars and said alcoholizing step further comprises converting at least a portion of said sugars to glycosides.

3. A method as defined in claim 2 wherein said sugars are selected from the group consisting of sorbitols, maltoses, glucoses and mixtures thereof.

4. A deicing composition comprising a water soluble hydroxycarboxylic acid ester in an amount effective to provide a freezing point lowering of said composition.

5. A deicing composition as defined in claim 4 wherein said hydroxycarboxylic acid ester is selected from the group consisting of hydroxyformate, hydroxyacetate, hydroxypropionate, hydroxybutyrate, hydroxylaurate, hydroxypalmitate, hydroxyoleate, hydroxybenzoate, and mixtures thereof.

6. A deicing composition as defined in claim 4 wherein said hydroxycarboxylic acid ester comprises an alkyl lactate.

7. A deicing composition as defined in claim 4 further comprising a low molecular weight glycoside selected from the group consisting of methyl glycoside, ethyl glycoside and mixtures thereof.

8. A deicing composition as defined in claim 4 further comprising a lignin compound.

9. A deicing composition as defined in claim 4 further comprising an anionic hydroxycarboxylic acid salt optionally in combination with amino acids.

10. A deicing composition as defined in claim 4 further comprising water soluble salts of dicarboxylic acids having at least three carbon atoms.

11. A deicing composition as defined in claim 10 wherein said dicarboxylic acid is selected from the group consisting of adipic acid, succinic acid, glutaric acid, malonic acid and mixtures thereof.

12. A deicing composition as defined in claim 4 wherein said hydroxycarboxylic acid ester is selected from the group consisting of ethyl lactate, glycol lactate, methyl lactate, ethyl glycinate, ethyl levulinate, ethylenecarbonate, glycerin carbonate, pipecolate, tetrahydrofurfuryl acetate, tetrahydrofurfuryl tetrahydrofuroate, glucose glutamate, and mixtures thereof.

13. A deicing composition as defined in claim 4 further comprising a salt selected from the group consisting of sodium lactate, cesium acetate, sodium acetate, potassium acetate, sodium formate, sodium citrate, lysine glutamate, sodium glucoheptonate, sodium and potassium salts of adipic, glutaric, succinic and malonic acids, lignin sulfonate and mixtures thereof.

14. A deicing composition as defined in claim 4 wherein said hydroxycarboxylic acid ester is obtained by alcoholizing hydroxycarboxylic acids contained in industrial waste streams, said waste streams comprising distiller grain solubles, whey, pulp mill black liquor, furfuryl derivatives from oats or mixtures thereof, with an alkyl alcohol.

15. A method of preparing a substantially environmentally benign deicing composition, said method comprising:
   (a) recovering an industrial waste stream comprising a sugar compound; and
   (b) alcoholizing at least a portion of the sugar compound in said recovered waste stream with an alkyl alcohol to convert said portion of sugar compound to alkyl glucosides.

16. A method as defined in claim 15 wherein said sugar comprises glucose, said alkyl alcohol comprises ethanol and said alkyl glucoside comprises ethyl glucoside.

17. A method of preparing a substantially environmentally benign deicing composition, said method comprising:
   (a) recovering an industrial waste stream comprising a waster soluble hydroxycarboxylic acid; and
   (c) reacting at least a portion of said water soluble hydroxycarboxylic acid to form anionic hydroxycarboxylic acid salts.

* * * * *